(12) United States Patent
Naeyaert

(10) Patent No.: US 10,945,379 B2
(45) Date of Patent: Mar. 16, 2021

(54) KNOTTER SYSTEM FOR A BALER

(71) Applicant: CNH Industrial America LLC, New Holland, PA (US)

(72) Inventor: Karel Naeyaert, Loppem (BE)

(73) Assignee: CNH Industrial America LLC, New Holland, PA (US)

( * ) Notice: Subject to any disclaimer, the term of this patent is extended or adjusted under 35 U.S.C. 154(b) by 516 days.

(21) Appl. No.: 15/809,370

(22) Filed: Nov. 10, 2017

(65) Prior Publication Data

US 2018/0125012 A1    May 10, 2018

(30) Foreign Application Priority Data

Nov. 10, 2016   (BE) ............................... BE2016/5848

(51) Int. Cl.
*A01F 15/14*    (2006.01)
*A01F 15/04*    (2006.01)

(52) U.S. Cl.
CPC .......... *A01F 15/145* (2013.01); *A01F 15/042* (2013.01)

(58) Field of Classification Search
CPC ...... B65H 69/04; A01F 15/145; A01F 15/042; A01F 15/14
USPC ................................................. 56/343; 289/2
See application file for complete search history.

(56) References Cited

U.S. PATENT DOCUMENTS

| 3,086,450 | A | 4/1963 | Tarbox |
| 3,443,511 | A | 5/1969 | Eby |
| 7,878,557 | B2 | 2/2011 | Eylenbosch et al. |
| 9,192,105 | B2 | 11/2015 | Demulder |
| 2006/0012176 | A1 | 1/2006 | Schoonheere et al. |
| 2009/0250930 | A1 | 10/2009 | Eylenbosch et al. |

FOREIGN PATENT DOCUMENTS

WO    2015014616 A1    2/2015

*Primary Examiner* — Nathan E Durham
*Assistant Examiner* — Abby M Spatz
(74) *Attorney, Agent, or Firm* — Peter Zacharias; Patrick Sheldrake

(57) ABSTRACT

A knotter system for performing a first knot forming cycle and a second knot forming cycle. The knotter system includes a needle for delivering a needle twine, a tucker arm for delivering a tucker twine, a twine receiver for holding the needle twine and the tucker twine, a billhook, a cutting arm, a twine finger for guiding at least the needle twine. The system further includes a drive to make the billhook perform first and second full rotations during the first and second knot forming cycles, respectively, and to move the twine finger at least a first time during the first knot forming cycle and a second time during the second knot forming cycle. The twine finger is configured such that during the second knot forming cycle the needle twine is moved away from the tucker twine in order to drape it adjacent to the tucker twine on the billhook.

17 Claims, 8 Drawing Sheets

KNOTTER SYSTEM FOR A BALER

FIELD OF THE INVENTION

The present invention relates to a knotter system, and in particular to a knotter system for a baler for forming two consecutive knots during a single knotter cycle.

BACKGROUND OF THE INVENTION

Rectangular bales are able to maintain their shape by means of a series of parallel extending twine loops, provided lengthwise around the bales. Known balers typically use automatic knotters by which two knots are made on every loop for binding a bale. An example of such a knotter system for a baler is disclosed in US 2006/0012176 in the name of the Applicant, the disclosure of which is included herein by reference. The knotter system disclosed in US 2006/0012176 has the advantage that two consecutive knots can be formed during one operation cycle, without the formation of twine tails. Similar improved knotter systems are disclosed in patent applications in the name of the Applicant with publications numbers US2009/0250930, WO2015/014616 and WO2014/060245, the disclosure of which is included herein by reference.

It has been noticed that during the forming of the second knot of the knotter cycle (this is the knot at the side where a new bale is going to be formed) the upper twine (the tucker twine) and the lower twine (the needle twine) may be crossing each other, resulting in a second knot with a reduced quality since crossing twines may hinder a good closing of the billhook.

SUMMARY OF THE INVENTION

The object of embodiments of the present invention is to further improve the knotter system of US 2006/0012176 and WO2014/060245, and more in particular to improve the forming of the second knot.

According to a first aspect of the invention, the knotter system is a knotter system for performing a knotter cycle comprising a first knot forming cycle and a second knot forming cycle. The knotter system comprises a needle, a tucker arm, a twine receiver, a billhook, a cutting arm, a twine finger and a drive means. The needle is configured for delivering a needle twine. The tucker arm is configured for delivering a tucker twine. The twine receiver is configured for holding the needle twine and the tucker twine. The cutting arm is adapted for cutting twines between the billhook and the twine receiver. The twine finger is configured for guiding at least the needle twine, said twine finger being mounted moveably below the billhook and the cutting arm. The drive means is adapted to make the billhook perform at least a first full rotation during the first knot forming cycle and a second full rotation during the second knot forming cycle; to move the cutting arm a first time from a rest position to an extended position and back during the first knot forming cycle and a second time during the second knot forming cycle, and to move the twine finger at least a first time during the first knot forming cycle and a second time during the second knot forming cycle. The twine finger is configured to guide, during the second knot forming cycle, the needle twine between the needle and the twine receiver, and to guide the tucker twine between the tucker arm and the twine receiver. The twine finger is configured such that during the second knot forming cycle the needle twine is moved away from the tucker twine in order to drape it adjacent to the tucker twine on the billhook. Preferably this is achieved by giving the twine finger a suitable shape.

By moving the needle twine away from the tucker twine it is avoided that the needle twine and tucker twine cross each other on the billhook. Moving the needle twine away from the tucker twine allows for a neat and accurate arranging of the needle twine on the billhook, adjacent to the tucker twine, resulting in an improved second knot. The invention is based amongst others on the inventive insight that by arranging the needle twine and the tucker twine in a controlled manner on the billhook, the position of the needle twine and tucker twine between the lower and upper lip of the billhook during rotation of the billhook, is controlled, resulting in an improved second knot.

In an exemplary embodiment the twine finger is configured such that during its movement during the second knot forming cycle it drapes first the needle twine on the billhook and next the tucker twine, such that the needle twine is further away from a tip of the billhook than the tucker twine. Preferably this is achieved by giving the twine finger a suitable shape.

In an exemplary embodiment the billhook comprises a lower lip and an upper lip mounted pivotally with respect to each other around a pivot axis. Preferably, the twine finger is configured such that during the second knot forming cycle the needle twine is moved away from the tucker twine in the direction of the pivot axis of the billhook, in order to drape it adjacent to the tucker twine on the billhook.

In an exemplary embodiment the twine finger is mounted on an upright pivot for lateral swinging movement between a retracted position and an extended position. Such a swing movement in combination with a suitable shape of the twine finger results in an accurate controlling of the guiding of the needle twine and tucker twine during the second knot forming cycle.

In an exemplary embodiment the twine finger comprises a first portion adapted to pick up, during a first part of the swinging movement during the second knot forming cycle, the needle twine whilst not picking up the tucker twine; and a second portion adapted to pick up, during a second part of the swinging movement during the second knot forming cycle, the tucker twine after the needle twine has been picked up and moved away by the first portion.

In an exemplary embodiment the twine finger has a more or less elongated plate shape with the pivot at one end and a mouth at the other end, said mouth being directed towards the tucker twine at the start of the second knot forming cycle. The first portion may then be located on an edge of the twine finger between the mouth and the pivot, and the second portion is located at an edge of the mouth. Such a shape has the advantage of being simple whilst achieving the desired effect of moving the needle twine away from the tucker twine.

In an exemplary embodiment the twine finger the drive means comprise an operating link, a crank and a transversely extending shaft, said operating link being attached at one end to the twine finger and at the opposite end to the crank for driving a swinging movement of the twine finger, said crank being fixed to said transversely extending shaft configured to be rotated such that the twine finger performs the swinging movement. The transversely extending shaft may carry a second crank which carries a cam follower at its outermost end, said cam follower being in position for operating engagement with a cam fixed to a driving shaft for rotation therewith. Preferably the cam has at least a first and second lobe for swinging the twine finger during the first and the second knot forming cycle, respectively. More preferably, the second lobe has two peaks and a valley between the two peaks, such that the twine finger is moved, during the second knot forming cycle, to a fully extended position, next to a non-fully extended position and then again to the fully extended position.

In an exemplary embodiment the cutting arm is configured for sweeping a formed knot from the billhook during the first knot forming cycle and during the second knot forming cycle, respectively.

In an exemplary embodiment the twine receiver is adapted to let the twines slip during the second knot forming cycle so that cutting of the needle and tucker twine is avoided when forming the second knot. By allowing the twines to slip during the second full rotation of the billhook, the cutting of the twines is avoided.

In an exemplary embodiment the drive means comprise a pinion and at least a first and second gear stretch provided along the circumference of a disc, said pinion being adapted to cooperate with said first and second gear stretch for making the billhook perform a first and second full rotation respectively when said disc is rotated for forming the first and the second knot, respectively. The drive means may further comprise a cam track and a cam follower, said cam follower being connected with the cutting arm, and said cam track being provided in said disc or in a member mounted for rotating synchronously with said disc, and being adapted for moving the cutting arm a first time and a second time during the first and the second knot forming cycle, respectively.

According to a preferred embodiment, the billhook comprises a lower lip, an upper lip and a positioning means for positioning the upper lip with respect to the lower lip. The positioning means may be adapted to move the lower lip away from the upper lip during the second knot forming cycle. By moving the lower lip away from the upper lip, the removal of the second knot from the billhook may be improved.

According to an exemplary embodiment, the drive means may be adapted to make the billhook perform a third full rotation during the knotter cycle, and to maintain the cutting arm in the extended position during at least a first part of said third rotation. More preferably, the positioning means are adapted to move the upper lip away from the lower lip during at least said first part of the third rotation, so that the second knot may be removed from the billhook during the first part of the third full rotation of the billhook. To that end the drive means may comprise a third gear stretch on the disc. The pinion may then be adapted to cooperate with the first, second and third gear stretch for making the billhook perform the first, second and third full rotation, respectively, when the disc is rotated.

According to an exemplary embodiment, the twine receiver comprises a twine disc and a twine holder. The twine holder is adapted to clamp twines against the twine disc. The knotter system may further comprise second drive means adapted for rotating the twine disc during a first turn whilst clamping twines for forming the first knot, and for rotating the twine disc during a second turn whilst letting twines slip for the forming of the second knot. According to an exemplary embodiment, the twine disc is provided with at least a first and a second notch for receiving the twines. The twines are typically in the first notch during the first turn and in the second notch during the second turn. Note however that during the beginning of the second turn, end parts of the twines may still be in the first notch. However, during the forming of the second knot, the end parts will slip first out of the first notch and then out of the second notch. According to a possible embodiment, the second notch is shaped in such a way that the twines are allowed to slip out of the second notch during forming of the second knot. According to another possible embodiment, the twine receiver is provided with biasing means for setting a bias for the clamping action by the twine holder. The biasing means may then be adapted to set a first bias during the first turn, and a second bias during the second turn. The first bias is chosen such that the twines are firmly clamped, while the second bias is chosen such that the twines are allowed to slip out of the twine receiver.

According to a preferred embodiment, the cutting arm is provided with a cutter and a removal means. The cutter is adapted for cutting twines between the billhook and the twine receiver, whilst moving from the rest position to the extended position, and the removal means are adapted for sweeping twines from the billhook whilst moving from the rest position to the extended position. Typically, the removal means have a shape which is complementary to the shape of the billhook in order to facilitate the removal of the twines.

BRIEF DESCRIPTION OF THE DRAWINGS

The advantages of this invention will be apparent upon consideration of the following detailed disclosure of exemplary non-limiting embodiments of the invention, especially when taken in conjunction with the accompanying drawings wherein.

DESCRIPTION OF THE DRAWING

In the description which follows and in certain passages already set forth, the principles of the present invention will be described in terms of "twine" and "knots" formed in such twine. However, it is to be recognized that such principles extend to wire and twisted junctions of wire as well as twine and knots.

Many of the fastening, connection, processes and other means and components utilized in this invention are widely known and used in the field of the invention described, and their exact nature or type is not necessary for an understanding and use of the invention by a person skilled in the art, and therefore they will not be discussed in significant detail. Also, any reference herein to the terms "left" or "right" are used as a matter of mere convenience, and are determined by standing at the rear of the machine facing in its normal direction of travel.

Figure 1:
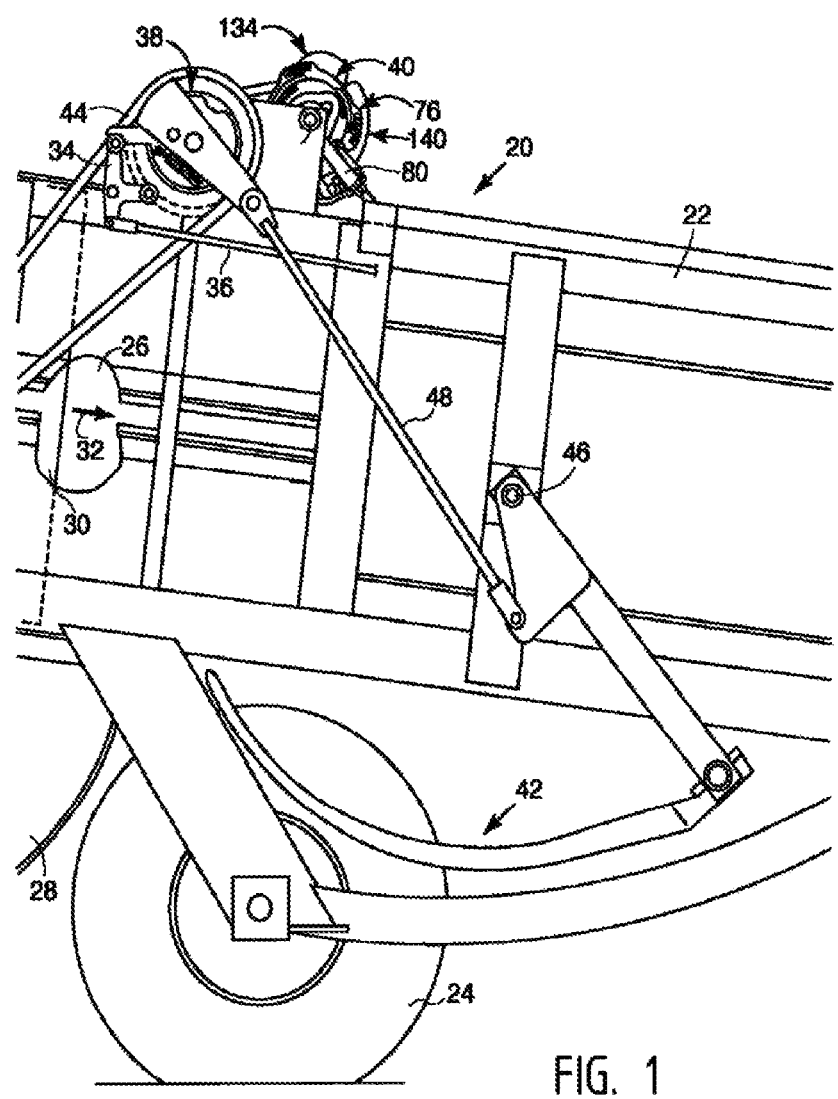
FIG. 1 is a fragmentary, side elevational view of a baler having a double knotter tying mechanism according to the prior art.

The baler 20 illustrated in FIG. 1 has a rectangular bale case 22 that is supported by ground wheels 24. The bale case 22 defines a bale chamber 26 wherein material is pushed in through a curved duct 28. A plunger 30 reciprocates within the bale case 22 to intermittently pack fresh charges of material from the duct 28 rearward in the chamber 26 in the direction of the arrow 32. When the bale reaches a predetermined size, a trigger 34 is pulled by a rod 36. This rod 36 engages a dog clutch 38, the clutch 38 in turn being connected to a tying mechanism 40 and a set of needles 42. As will be appreciated, the tying mechanism comprises a set of individual knotters 40 provided crosswise on top of the bale chamber 26 at intervals. Each knotter 40 has an associated needle 42 for assisting in forming an individual loop around a finished bale. When the bale needs tying, the dog clutch 38 connects the knotter 40 and their needles 42 via a drive chain 44 to a source of driving power to initiate the tying operation. As the individual knotters 40 all operate in an identical manner, it suffices to describe the present invention in relation to only one such knotter 40.

Figure 4:
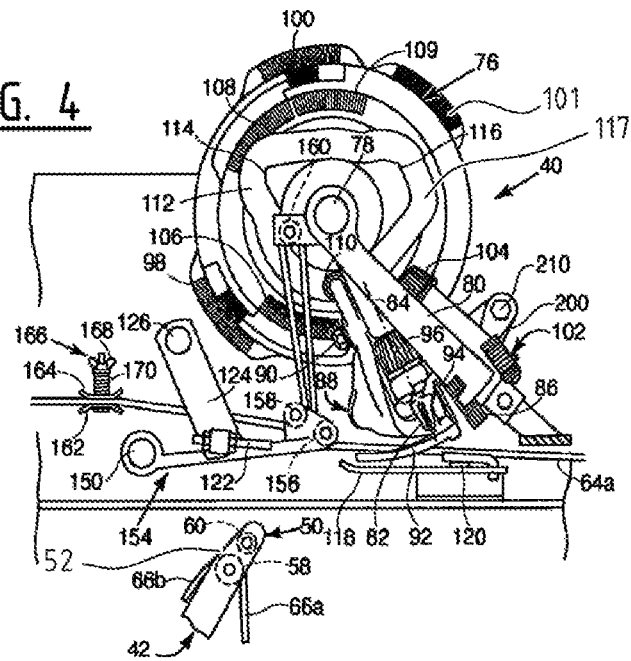
FIG. 4 is an enlarged, fragmentary, side elevational view of an exemplary embodiment of a knotter system in mid cycle.

The needle 42 is swingably mounted on the bale case 22 by a pivot 46 and is swung back and forth across the bale chamber 26 by a linkage 48, which is activated by the clutch 38. The needle 42 has an "at-home" or rest position fully below the bale case 22 as illustrated in FIG. 1 and a "full-throw" position extending completely across the bale case 22 as illustrated, for example, in FIG. 9. As illustrated in FIG. 4, the tip 50 of needle 42 has an eyelet 52 in conjunction with a pair of longitudinally spaced, transversely extending rollers 58 and 60. In the illustrated embodiment the roller 58 is positioned inwardly from the outer extremity of the tip 50, while the roller 60 is positioned outwardly from the roller 58 more closely adjacent this extremity. The roller 60 is positioned a short distance inwardly from the outer extremity of the tip 50, and both of the rollers 58 and 60 may be tapered toward their mid points, comparable to a diabolo, so as to provide secure seats for the twine.

Figure 2:
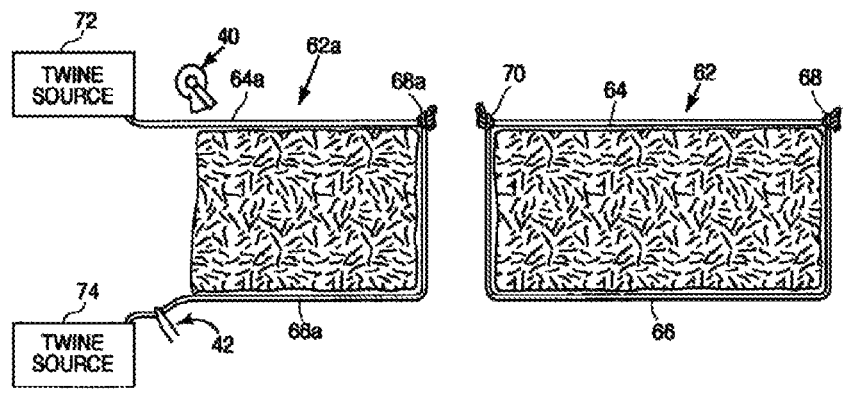
FIG. 2 is a diagrammatic view of a complete and a partial double-knotted loop without the forming of twine tails, according to the prior art.

With reference to FIG. 2, to the left of loop 62 is a partial loop 62a which is in the process of being formed. The already completed bale on the right is wrapped by a loop 62 formed by a top and bottom twine 64, 66 which are knotted in the two top corners of the bale, see knots 68 and 77. The partial loop 62a around the bale that is being formed comprises a top twine 64a (also called tucker twine) and a bottom twine 66a (also called needle twine). The top twine 64a emanates from a source of twine supply 72, while the bottom twine 66a emanates from an entirely separate, second source of twine supply 74. At the particular point in the sequence chosen for illustration, a knot 68a (this is the second knot of an already executed knotter cycle where knot 70 was formed as the first knot and knot 68a as the second knot) is in existence, and the bale is approaching that length where the needle 42 is ready to swing into operation and present the twines 64a and 66a to the knotter 40 to start a knotter cycle in which two consecutive knots are being formed. In a finished bale, the loop 62 is made from two strands of binding material, i.e., one strand of twine 64 along the top side of the bale and a second strand of twine 66 along the bottom side of the bale and its two opposite, vertical ends. The strands of twine 64 and 66 together form the continuous loop 62. Together, they fully circumscribe the bale. The knot 70 (this is the first knot of a knotter cycle) is typically a traditional knot. The knot 68, 68a of a bale (this is the second knot of a knotter cycle) may be a traditional knot or a so called loop-knot. In a loop-knot the ends of the twines 64, 64a and 66, 66a of the knot 68, 68a are released from a retained position so they can be pulled back as will be described further to form a small loop on top of the knot. The knot 68, 68a itself holds the ends of the twines 64, 64a and 66, 66a united with the knot 68, 68a.

With this short explanation in mind, the details of the embodiments according to the present invention will now be described. FIG. 3 illustrates a first embodiment according to the invention, and FIGS. 4, 5, 6 and 7 illustrate a second embodiment. For convenience the same reference numerals have been used for referring to similar elements in the different embodiments. The knotter 40 is similar in many respects to the knotters disclosed in US2006/0012176, WO2015/014616 and WO2014/060245 in the name of the Applicant, and the disclosure of those documents is herein incorporated by reference.

The knotter 40 of FIGS. 3 and 4 comprises a generally circular element, also called knotter disc 76 that is secured to a drive shaft 78 for rotation with the latter through one full revolution when the clutch 38 is engaged. The shaft 78 is supported by a forwardly inclined frame 80 attached to the top of the bale case 22, and the frame 80 also supports the knotter components for forming the knots in response to rotation of the knotter disc 76. Briefly, such knotter components include a rotary billhook member 82, supported by the frame 80 for rotation about an inclined axis 84; a twine disc 86 rearwardly of and adjacent to the billhook 82 for holding strand 64a of tucker twine and strand 66a of needle twine in position for engagement by the billhook 82 during rotation of the latter; and a cutting arm 88 with a knife 94 and with removal means 92 for sweeping the connected strands from the billhook 82. The cutting arm 88 is pivotally attached to the frame 80 by a bolt 90. The strands 64a and 66a are held in notches 87 (see FIG. 3 and FIG. 6) in the rotating twine disc 86 by a retainer or twine holder 220. The tensioning force of this retainer 220 to the twine disc 86 can be adjusted manually by changing the tension of a leaf-spring 200 when a bolt 210 is loosened or tightened.

The lower end of the cutting arm 88 is shaped in such a way that it opens away from the twine disc 86 beneath the billhook 82. The cutting arm 88 further carries a knife 94 between the billhook 82 and the twine disc 86 for severing the strands 64a and 66a in response to a swinging movement of the cutting arm 88 in the proper direction. Such movement of the cutting arm 88 to operate the knife 94 also serves to bring the removal means 92 in engagement with a knot formed on the billhook 82 for stripping such knot off of the billhook 82. The removal means 92 preferably have a shape which is substantially complementary to the shape of the billhook 82 to improve this sweeping of the billhook.

In order to transmit driving power to the billhook 82, the knotter disc 76 is provided with a pinion 96 which is disposed for meshing engagement with a pair of circumferentially spaced gear stretches 98, 100 and 101 on the knotter disc 76. Similarly, driving power is transmitted to the discs of the twine disc 86 through, a twine disc pinion 103, a worm gear drive 102 and a bevel gear 104 in position for sequential meshing engagement with a pair of circumferentially spaced gear sections 106, and 108 on the knotter disc 76. Power to swing the cutting arm 88 about the pivot bolt 90 is obtained through a cam follower 110 at the upper end of the cutting arm 88 beyond the pivot bolt 90 which is disposed within a cam track 112 on the knotter disc 76. A pair of circumferentially spaced cam shoulders 114 and 116 in the track 112 are positioned to sequentially engage the follower 110 to operate the latter.

Figure 5:
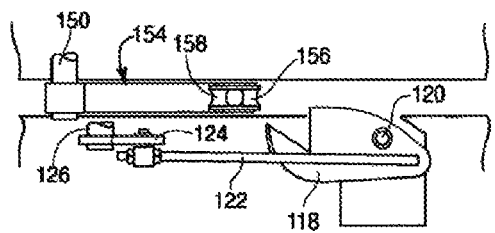
FIG. 5 is a fragmentary, plan view taken substantially along line 4-4 of FIG. 4.
Figure 6:
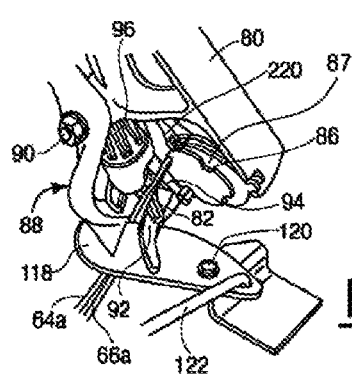
FIG. 6 is a fragmentary, front perspective view of an exemplary embodiment of a knotter system with strands of twine draped across the billhook and held by retaining discs in readiness of preparing a knot.
Figure 7:
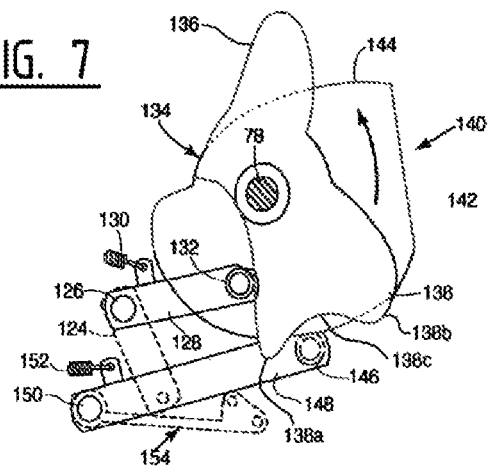
FIG. 7 is a fragmentary, elevational view of cams on a drive shaft of an exemplary embodiment of a knotter system, for operating a slack take-up device and a twine finger.

A twine finger 118 is located below the billhook 82 and the cutting arm 88 of the knotter 40 and is mounted on an upright pivot 120 for lateral swinging movement between a standby position illustrated in FIGS. 4 and 5 and a laterally extended position somewhat beyond that illustrated in FIG. 6, as will be further illustrated below with reference to FIGS. 18A-18F. An operating link 122 attached at one end to the twine finger 118 and at the opposite end to a crank 124 serves to effect swinging of the twine finger 118. The crank 124 is in turn fixed to a transversely extending shaft 126 that extends to a point behind the knotter disc 76 where it may carry a second crank 128 as illustrated in FIG. 7. The crank 128 is biased upwardly in a counter-clockwise direction by a coil spring 130 and carries a cam follower 132 at its outermost end. The follower 132 is in position for operating engagement with a multiple-lobed cam 134 fixed to the shaft 78 for rotation therewith, its lobes 136 and 138 being circumferentially spaced apart in accordance with the desired timed relationship between the twine finger 118 and the knot-forming components of the knotter 40, as will be further explained below. The first lobe 136 is for performing a first swinging movement during the first knot forming cycle of a knotter cycle, and the second lobe 138 is for performing a second swinging movement during the second knot forming cycle of a knotter cycle. It is noted that the second lobe 138 is formed with two peaks 138a and 138b and a valley 138c between the two peaks 138a, 138b such that the twine finger 118 is moved first to a first extended position (see also FIG. 18C) corresponding with peak 138a, then to a second position (corresponding with valley 138c, see also FIG. 18D) which is slightly retracted with respect to the first extended position, and next to a second extended position corresponding with peak 138b (see also FIG. 18E).

Also mounted on the shaft 78 with the cam 134 is a second cam 140 having a peripheral land stretch 142 over approximately 180 degrees of its circumference and a peripheral valley stretch 144 over the remaining approximately 180 degrees of its circumference. Such stretches 142 and 144 are disposed for operating engagement with a cam roller 146 located at the outer end of a lever 148 that is fixed at its inner end to a transverse shaft 150. The lever 148, and hence the shaft 150, are biased in a counter-clockwise direction viewing FIG. 7 by a coil spring 152. The shaft 150 extends back out to the opposite side of the knotter disc 76 parallel with the shafts 78 and 126 to a point substantially in fore-and-aft alignment with the billhook 82. At that location, the shaft 150 fixedly carries a rearward extending tucker arm 154 of a slack take-up device. The tucker arm 154 may carry a pair of spaced rollers 156 and 158 at its rearmost end around which the strand 64a of tucker twine is entrained as illustrated in FIG. 4. A length of the strand 64a is also looped upwardly around another roller 160 disposed above the device 154. The strand 64a may be clamped between a pair of opposed plates 162 and 164 (FIG. 4) of a tensioning unit 166. The force with which the plates 162 and 164 clamp the strand 64a may be controlled by a wing nut 168 operating against a spring 170 that in turn presses against the movable plate 164. A tensioning unit similar to unit 166 may also be provided for the strand 66a of needle twine, although such additional unit is not illustrated.

In other embodiments the tucker arm 154 may carry only one roller 156, and further rollers may be included in other parts 160 of the slack take-up device, see e.g. FIG. 3 where the tucker arm 154 has a roller 156 receiving a twine 64a directly from roller 160 of an upper part of the slack take-up device. The skilled person understands that yet other embodiments are possible with more or less rollers for guiding twine 64a.

Figure 8:
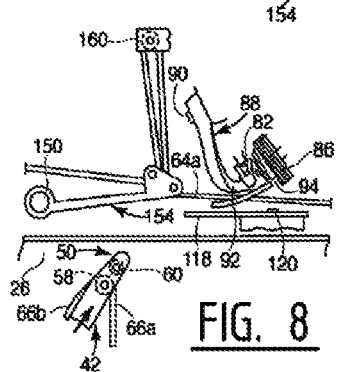
FIGS. 8 to 17 are fragmentary, schematic views illustrating the successive steps of a double-knotting operation.

The condition of the partial loop 62a in FIG. 2, and that of the knotter 40 and the needle 42, corresponds substantially with conditions illustrated in FIGS. 4 and 8, with the exception that in FIG. 2, the needle 42 is still in its home position. At this point in the bale forming operation, the bale has reached its desired length and it is time to complete the loop around the bale and make the top left knot in the loop 62a. It is remarked that at this specific instance, the strand 64a of tucker twine stretches along the top of the bale directly beneath the cutting arm 88 but, at least for all effective purposes, is out of contact with the knotter 40. As illustrated in FIG. 8, as the needle 42 swings upwardly toward the knotter 40, it carries with it the strand 66a of needle twine as the latter is paid out by source 74. Note that because the strand 66a is threaded through the eyelet 52 of needle 42, a length of that strand on the twine source side of the needle 42 is also carried upwardly toward the knotter 40, such extra length being hereinafter denoted 66b. While the needle 42 approaches the knotter 40, no additional length of the strand 64a of tucker twine is pulled from the source 72. Even as the tip of the needle 42, and more particularly, the roller 60, snares the strand 64a as illustrated in FIG. 9 and presents strands 64a and 66a in unison to the knotter 40, still no additional length of the strand 64a is pulled from source 72 because the device 154 rocks upwardly in a counter-clockwise direction to provide the slack necessary in the strand 64a to accommodate the needle movement.

Figure 9:
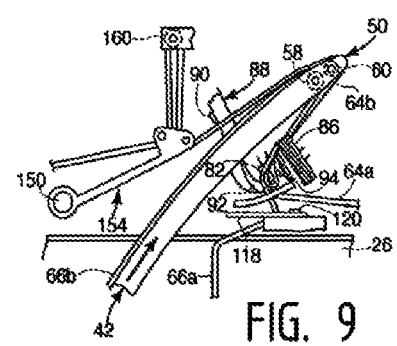
Figure 10:
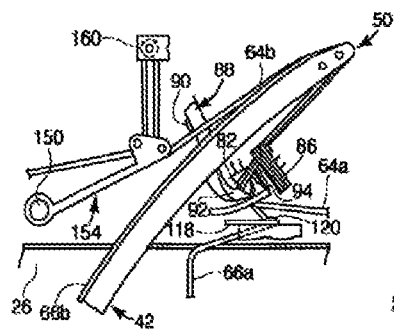

While the strands 64a and 66a are being delivered across the billhook 82 to the twine disc 86, the twine finger 118 is actuated to swing inwardly and engage at least the strand 66a of needle twine as illustrated in FIGS. 9 and 10 so as to assure that the strands 64a and 66a are both in proper position across the billhook 82. The twine finger 118 holds the strand 66a on the billhook 82 during the entire first knot forming cycle of a knotter cycle.

Figure 11:
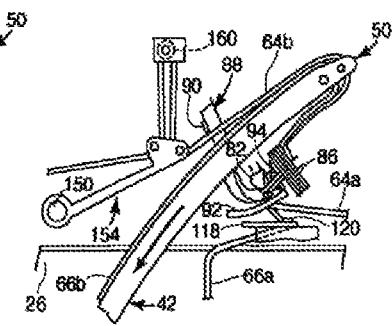
Figures 12, 13:
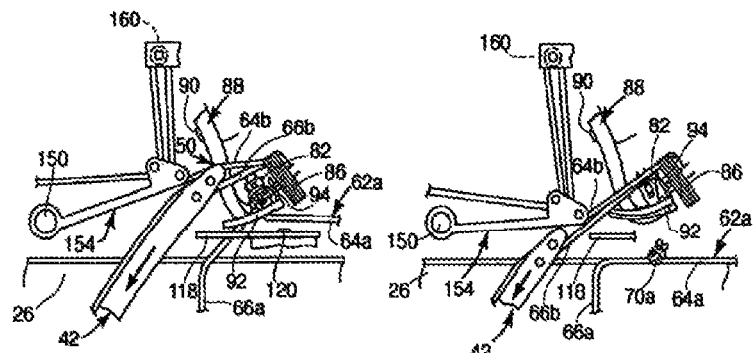

In presenting the strands 64a and 66a, the needle 42 actually drapes the strands 64a, 66a across the billhook 82 and thence into awaiting notches of the twine disc 86, whereupon rotation of co-operating discs in the latter, in combination with a pressing twine holder 220, serve to firmly grip the strands and prevent their escape as the billhook 82 begins its rotation as illustrated in FIG. 10. The needle 42 reaches its highest position and starts to go down, see FIG. 11. The twine disc 86 rotates a quarter of a turn and clamps the twines 64b and 66b firmly together. During the down travel of the needle 42 the two twines on the back of the needle 42 are placed in the next notch of the twine disc 86 for the second knot (FIG. 12). While the needle 42 goes down, the billhook 82 rotates to form the first knot 70a. The cutting arm 88 swings out to cut the twines under the twine disc and sweeps the first knot 70a from the billhook.

Figure 3A:
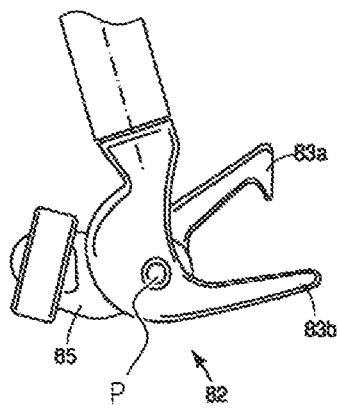
FIG. 3A is a detailed view of the billhook thereof.
Figure 3:
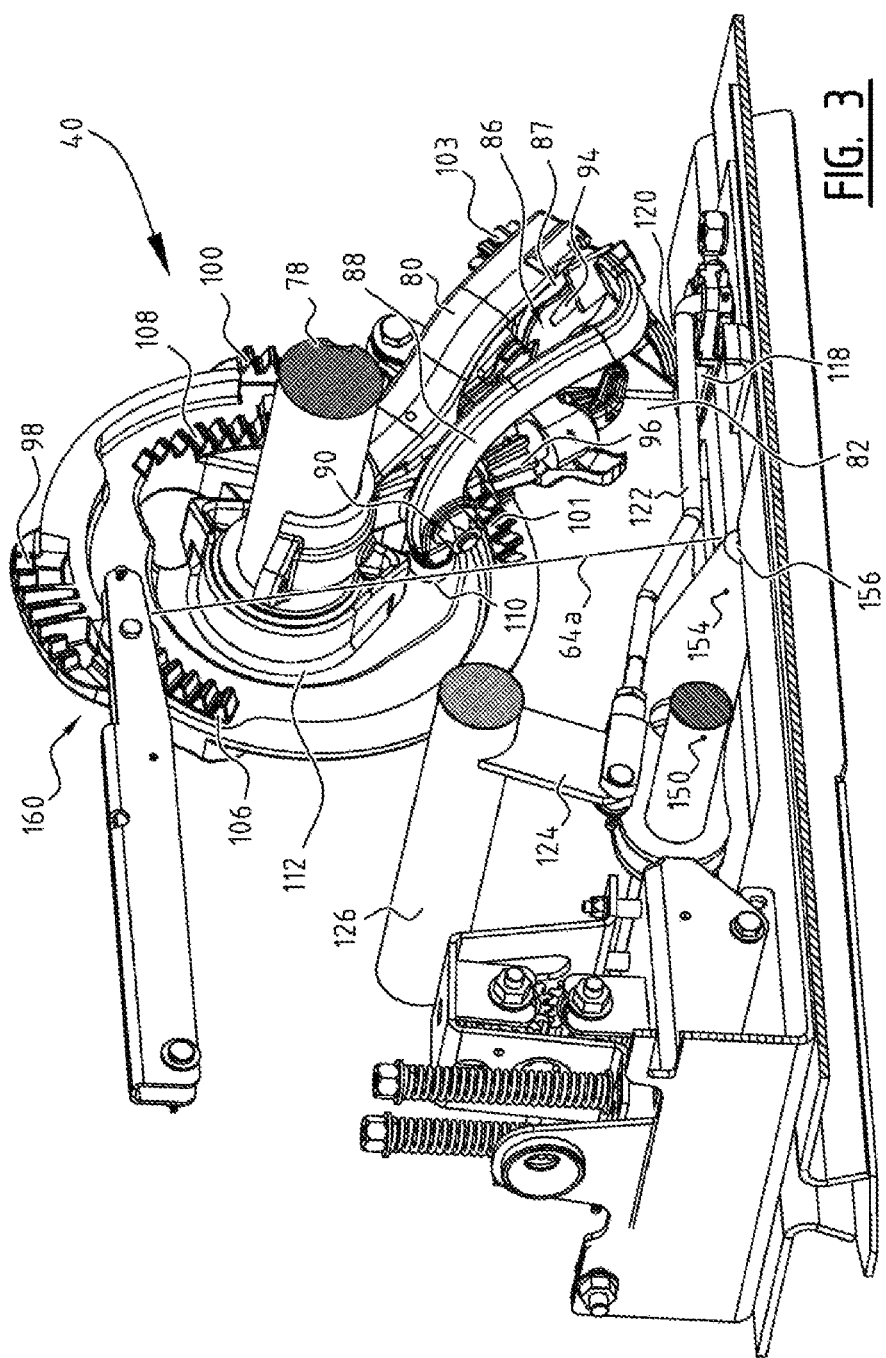
FIG. 3 is an assembled perspective view of an exemplary embodiment of a double knotter system.

FIG. 3A shows the billhook 82 in more detail. The billhook 82 comprises a lower lip 83b and an upper lip 83a mounted pivotally around pivot axis P with respect to lower lip 83b. When the billhook 82 rotates around its axis 84, a cam follower 85 (see FIG. 3A), which is connected to the upper lip 83*a*, engages an element having a cam shoulder (not shown). When rotating, the cam follower will push the upper lip 83*a* away from the lower lip 83*b*, thus enabling the strands 64*a* and 66*a* to enter in between the two lips 83*a* and 83*b* while the billhook is rotated.

When the needle 42 delivers the strands 64*b* and 66*b* to the twine disc 86, the twine disc 86 rotates in such a manner that the strands 64*b* and 66*b* are retained twice in different notches in the twine disc 86. By doing so, two knots 70*a* and 68*b* can be formed during one knotter cycle as will be explained further, whereby the knife 94 severs the strands 64*a* and 66*a* from the strands 64*b* and 66*b* after the first knot 70 is formed and the removal part 92 of the cutting arm 88 removes the first knot 70*a* from the billhook 82, thus separating the two loops from each other. The adjustable leaf-spring 200 pushes against the twine holder 220, thus co-operating with the twine disc 86 to retain the strands.

The foregoing described movement on the part of the billhook 82 and the twine disc 86 are, brought about by operable inter-engagement of the gear stretch 98 and gear section 106 on the knotter disc 76 with their respective gears 96 and 104 on the billhook 82 and the twine disc 86. Such driving inter-engagement continues until a first knot 70*a* has been formed on the billhook 82 as illustrated in FIGS. 11 and 12, by which time the needle 42 has begun to withdraw. At this point, the cam shoulder 114 of the knotter disc 76 comes into engagement with the roller 110 of the cutting arm 88 so as to swing the bottom of the latter, and hence the knife 94, across that portion of the strands between the billhook 82 and the twine disc 86, thereby severing the same as illustrated in FIG. 12 and previously explained. At the moment of cutting, the strands 64*a* and 66*a* extend from in between the lips 83*a* and 83*b* towards the twine disc 86. Considering that the knife 94 moves closely alongside the billhook 82, the free ends of the cut strands 64*a* and 66*a* extend only over a very short distance out of the lips 83*a* and 83*b*. To complete the first knot forming cycle, the removal part 92 of cutting arm 88 engages the strands 64*a* and 66*a* which are retained around the billhook 82. In so doing, the strand parts lying on top of the lip 83*a* are pulled over the strand parts laying in between the lips 83*a* and 83*b*, thereby forming the first knot 70*a*. As described above, since the free ends of the strands 64*a* and 66*a* are very short, they are pulled completely through the first knot during its final formation, resulting in the so-called conventional knot 70*a*, as best seen in FIG. 13. Besides completing the first knot, further motion of the cutting arm 88 also strips the finished knot 70*a* completely from the billhook 82 and drops the completed loop 62*a* on the bale as illustrated in FIG. 13.

Figures 14, 15:
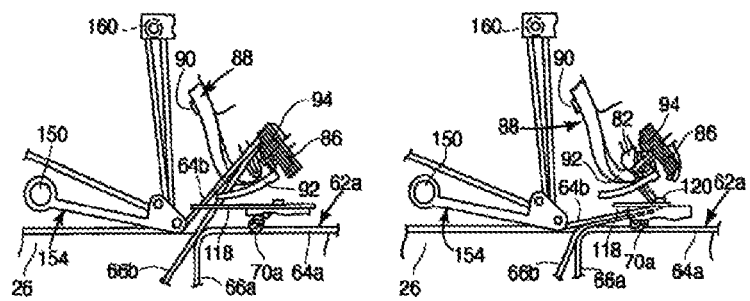

When the first knot 70*a* is dropped by the knotter 40 following severance and stripping from the billhook 82, the strand 66*b* of needle twine from source 74, as well as strand 64*b* of tucker twine from source 72 is still retained in the second notch and possibly also in the first notch of the twine disc 86. At this instance, the upper lip 83*a* is open again. Consequently, as the needle 42 continues to retract, the strand 66*b* is draped downwardly across the bale chamber 26 thereby pushing the upper lip 83*a* down because of the pressure of the strands on the upper lip 83*a*, while the tucker arm 154 lowers to its normal position to pull a small amount of additional twine from the source 72. Upon reaching the condition illustrated in FIG. 14, the strands 64*b* and 66*b* are in position for initiating the second knot forming cycle which is started by the twine finger 118 (which has been previously returned to its standby position) swinging inwardly to engage the strands 64*b* and 66*b* and to assure that the strands 64*b* and 66*b* are properly positioned across and in engagement with the billhook 82, see FIG. 15, whereupon the latter and the twine disc 86 are operated by their second respective gear stretch 100 and gear section 108 on the knotter disc 76 to form the second knot 68*b* on the billhook 82.

Figure 18A:
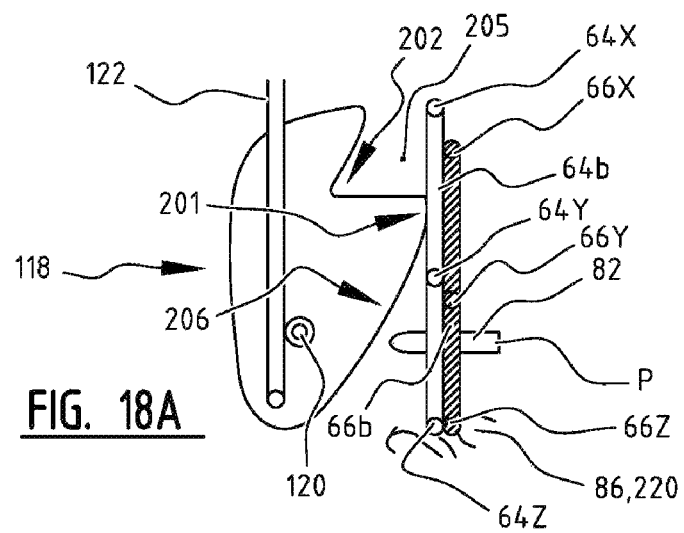
FIGS. 18A-18F are schematic top views of an exemplary knotter system illustrating consecutive moments during the forming of the second knot of a knotter cycle, wherein the cross section of the twines 64$b$, 66$b$ with a horizontal plane at three different heights has been indicated with the letters X, Y and Z (see 64X, 64Y, 64Z and 66X, 66Y, 66Z); wherein X corresponds with the level of the twine finger, Y corresponds with the level of the billhook and Z corresponds with the level of the twine receiver.

Now the twine finger 118, and the movement thereof during the second knot forming cycle will be discussed in more detail with reference to FIG. 18A-F. At the end of the first knot forming cycle the twine finger has been moved back to a rest position which is illustrated in FIG. 18A. Strand 64*b* of tucker twine extends from the tucker arm 54, across billhook 82, to the twine receiver 86, 220. In a horizontal plane X at the level of the twine finger 118, the strand 64*b* is at a location 64X. In a horizontal plane Y at the level of the billhook 82, the strand 64*b* is at a location 64Y, which is at a distance from the billhook 82 in the start position of the second knot forming cycle illustrated in FIG. 18A. In a horizontal plane Z at the level of the twine receiver 86, 220, the strand 64*b* is at a location 64Z. Strand 66*b* of needle twine extends from the needle 42, across billhook 82, to the twine receiver 86, 220. In a horizontal plane X at the level of the twine finger 118, the strand 66*b* is at a location 66X, at a distance of the strand 64*b* of tucker twine. In a horizontal plane Y at the level of the billhook 82, the strand 66*b* is at a location 66Y, which is at a distance from the billhook 82. In a horizontal plane Z at the level of the twine receiver 86, 220, the strand 66*b* is at a location 66Z. From FIG. 18A and FIG. 13 it can be observed that the strand 66*b* of needle twine is closer to the billhook 82 than the strand 64*b* of tucker twine: the cross section 66X is closer to the billhook 82 than the cross section 64X, and the cross section 66Y is closer to the billhook 82 than the cross section 64Y.

Figure 18B:
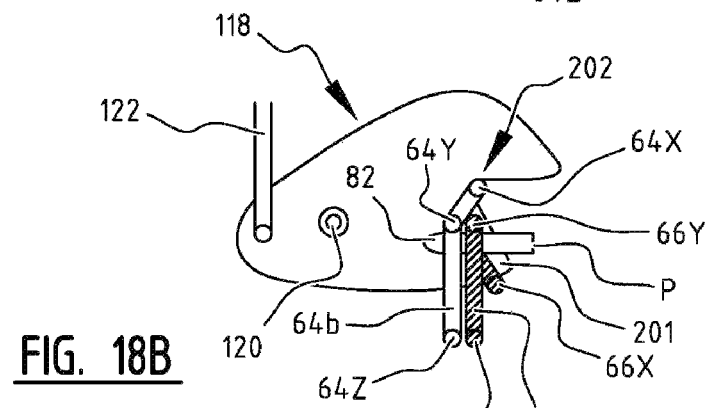

When a twine finger of the prior art is swung from the rest position to an extended position strands 64*b* and 66*b* are pushed against each other underneath the billhook leading to the strands 64*b* and 66*b* crossing each other, resulting in a bad quality knot. According to embodiments of the invention the twine finger 118 is configured to guide and position, during the second knot forming cycle, the needle twine between the needle 42 and the twine receiver 86, 220, and to guide and position the tucker twine between the tucker arm 54 and the twine receiver 86, 220, wherein the twine finger 118 is shaped such that during the second knot forming cycle the needle twine is moved away from the tucker twine, in the direction of the pivot axis P between the lower and the upper lip of the billhook 82, in order to drape it adjacent to the tucker twine on the billhook. This is illustrated in FIG. 18B. The strand 66*b* of needle twine is picked up first by first portion 201 of twine finger 118 and moved underneath billhook 82, see reference 66X in FIG. 18B referring to the cross section of strand 66*b* with a horizontal plane X at the level of the twine finger 118. This first portion 201 moves underneath strand 64*b* of tucker twine, such that the tucker twine is not picked up by first portion 201. Strand 64*b* of tucker twine is picked up by a second portion 202, see reference 64X in FIG. 18B referring to the cross section of strand 64*b* with a horizontal plane X at the level of the twine finger 118. This movement of the twine finger 118 will also drape the strands 64*b*, 66*b* along the billhook 82, see reference 64Y and 66Y showing the cross section of strand 64*b* and 66*b* with a horizontal plane Y at the level of the billhook 82, respectively. More in particular, the twine finger 118 is shaped such that during its movement during the second knot forming cycle it drapes first the needle twine 66*b* on the billhook 82 and next the tucker twine 64*b* and such that the needle twine 66*b* is further away from a tip of the billhook 82 than the tucker twine 64b. This will avoid that the strands 64b, 66b cross each other and provides a good control of the location of the needle and tucker twine on the billhook 82.

In other words, in the illustrated embodiment, the twine finger 118 comprises a first portion 201 adapted to pick up, during a first part of the swinging movement during the second knot forming cycle, the needle twine 66b whilst not picking up the tucker twine 64b, as explained above. Further the twine finger 118 comprises a second portion 202 adapted to pick up, during a second part of the swinging movement during the second knot forming cycle, the tucker twine 64b after the needle twine 66b has been picked up and moved away by the first portion 201.

To obtain a twine finger 118 with a first and second portion having the above mentioned function, a suitable shape of the twine finger is a fish shaped plate portion with a mouth 205, wherein the first portion 201 is located at an edge 206 of the twine finger 118 between the mouth 205 and the pivot 120, and the second portion 202 is located at an edge of the mouth 205.

Figure 18C:
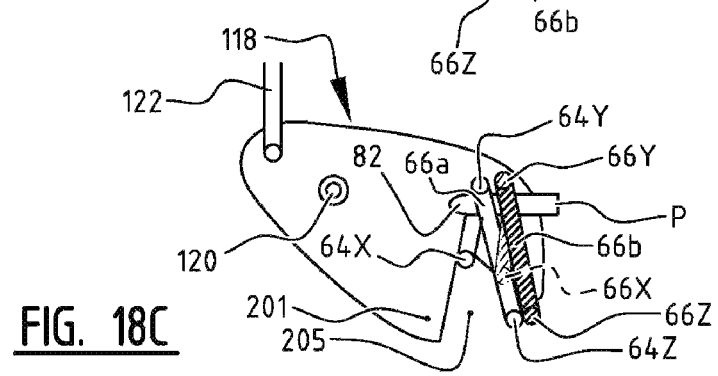
Figure 18D:
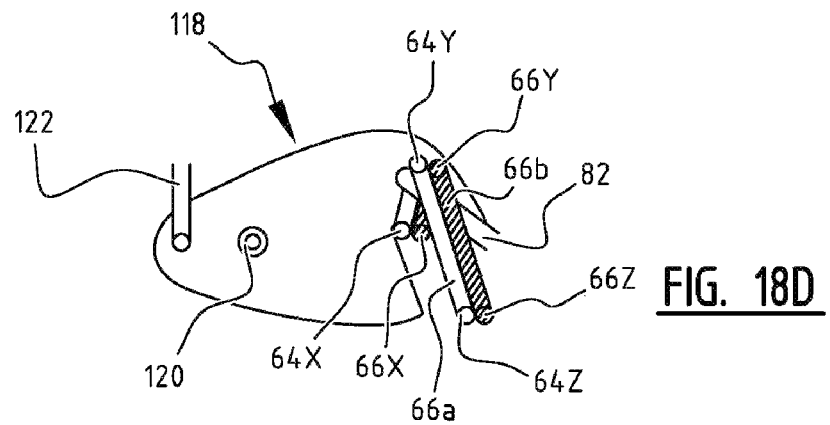
Figure 18E:
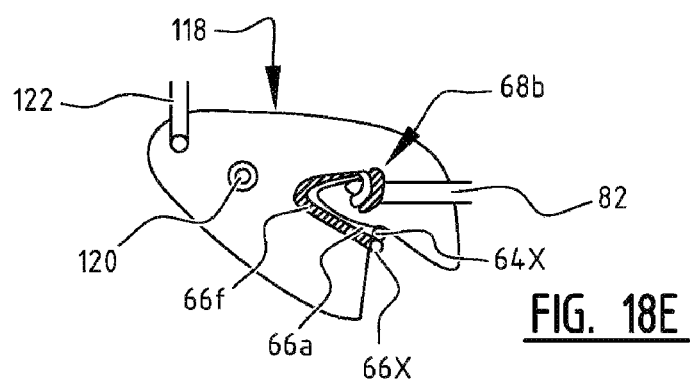
Figure 18F:
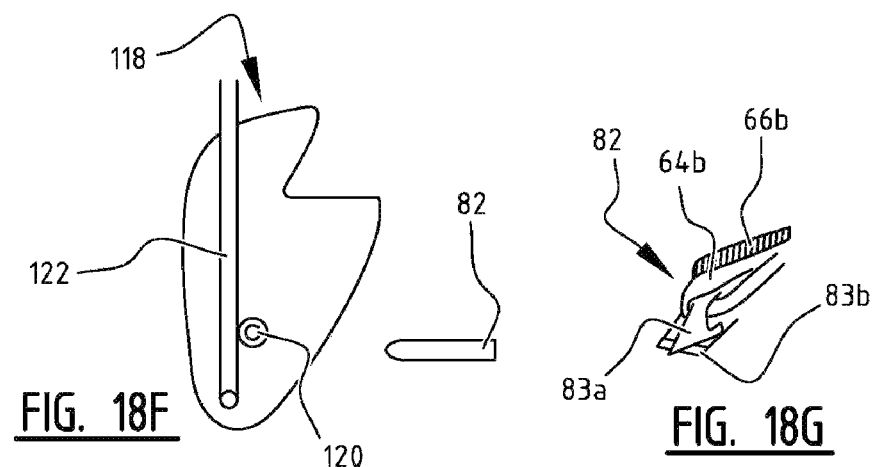
Figure 18G:
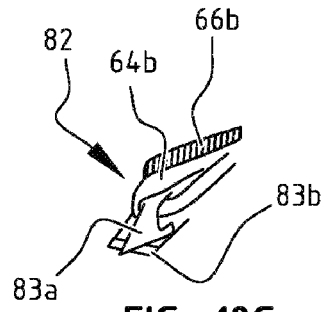
FIG. 18G is a schematic perspective view of the second knot on the billhook.

Once the strands 64b and 66b are draped suitably across the billhook 82 as illustrated in FIG. 18B, the twine finger 118 may be further swung to its extended position, see FIG. 18C causing strand 66b to loose contact with the first portion 201 and to jump to a location 66X in FIG. 18C next to the strand 64a in mouth 205. As explained above, this may be achieved by providing a peak 138a in second lobe 138. Now the billhook 82 can be rotated to form the second knot, see FIG. 18D whilst the twine finger 118 may be swung slightly backward. In that manner additional twine length is provided to form the second knot. As explained above, this may be achieved by providing a valley 138c in second lobe 138. FIG. 18G shows the twines 64b, 66b on the billhook 82 during the rotation to form the second knot, wherein the twine are neatly arranged above the upper lip 83a and between the upper lip 83a and the lower lip 83b. Next, the twine finger 118 is again moved forward to its fully extended position (peak 138b of second lobe 138) and the cutting arm 88 is moved to remove the second knot 68b from the billhook 82, see FIG. 16 and FIG. 18E. Now the twine finger may be moved back to its rest position, see FIG. 18F, ready for a next knotter cycle.

Figures 16, 17:
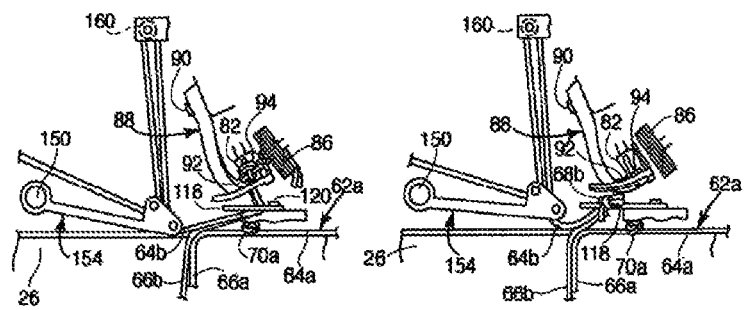

The second knot 68b becomes formed as illustrated in FIG. 16, whereupon the cutting arm 88 is once again actuated, but this time by the second cam shoulder 116. In a possible embodiment the pressure of the twine holder 220 on the twine disc 86 and/or the shape of those elements should be such that a controlled slipping of the strands 64b and 66b is obtained during the formation of the second knot 68b. This may be reached by a suitable form of the twine disc 86, and in particular by a suitable shape of the recess in which the strands 64b and 66b are taken up. According to an alternative variant the pressure exerted by a leaf spring on the twine holder 220 may be regulated using a setting means adapted to decrease this pressure when the gear 96 engages gear section 100. According to yet another possibility the twine holder 220 may be pushed away against the force of the leaf spring during the formation of the second knot. The skilled person understands that this regulating of the pressure/pushing away of the twine holder can be reached using any suitable mechanical or hydraulic transfer, e.g. by a mechanically coupling the rotation of the knotter disc 76 and the setting means for setting the pressure exerted on the twine holder 220. Also, instead of providing a spring means, there could be provided an actuator for biasing the twine holder 220, which actuator could be regulated for exerting a lower biasing during the second knot forming cycle. Finally the skilled person understands that an adaption of shape of the notches 87 and the use of a biasing means may be combined.

Because the free ends of the strands 64b and 66b are considerably longer than the free ends obtained during the first knot forming cycle of the knotter cycle, upon finalizing the second knot 68b, free ends 64b and 66b may no longer be pulled completely out of the knot, resulting in a so-called loop-knot 68b, as best seen in FIG. 17.

The cam shoulder 116 may extend over a part of the circumference, see also reference numeral 117 in FIG. 4, so as to create a large shoulder which keeps the knife 94 in its furthest extended position after removal of the knot 68b of the billhook 82. This position of the cutting arm 88 is best illustrated in FIG. 3. Pinion 96 will now engage gear stretch 101 and continue to rotate while the upper and lower lips 83a and 83b open a little. By keeping the cutting arm 88 in its furthest position and continuing to rotate the billhook 82, it is made sure that the strands can be properly removed and do not remain attached to the billhook.

As illustrated in FIG. 4, there may be provided a supplementary gear section 109 providing a prolonged operation of the twine disc 86. In that way the strands 64b and 66b will no longer be retained between the twine disc 86 and the twine holder 220, causing a further slipping of the twines during the forming of the second knot. Indeed, even though the knife 94 is very sharp, it will not be able to cut the strands because instead of holding the strands, the twine disc 86 is releasing them on account of the continued rotation of the twine disc 86 and the low pressure of the twine holder 220 on the twine disc 86, while the cutting arm 88 continues moving and stripping of the almost completed knot from the billhook 82, thus pulling the strands out of the twine disc 86. The skilled person understands that the supplementary gear section 109 is not necessary, and that substantially the same effect can be reached when the tensioning force of a spring means on the twine holder 220 is sufficiently decreased.

The second knot 68b is the start of a new bight for the next bale. Such bight is in position to receive new material that is packed into the bale chamber 26 by the plunger 30, and the bight grows in length as additional lengths of the strands 64b and 66b are simultaneously pulled from their sources 72 and 74. Finally, when the bale has reached its desired size, the sequence returns to its starting point, whereupon the bight is closed by operation of the needle 42 to complete the loop around the bale and form the other knot.

While the principles of the invention have been set out above in connection with specific embodiments, it is to be understood that this description is merely made by way of example and not as a limitation of the scope of protection, which is determined by the appended claims.

The invention claimed is:

1. A knotter system for performing a knotter cycle comprising a first knot forming cycle and a second knot forming cycle, the knotter system comprising:
    a needle configured for delivering a needle twine;
    a tucker arm configured for delivering a tucker twine;
    a twine receiver configured for holding the needle twine and the tucker twine;
    a billhook;
    a cutting arm configured for cutting twines between the billhook and the twine receiver;
    a twine finger configured for guiding at least the needle twine, the twine finger being mounted moveably below the billhook and the cutting arm;
    a driver configured to:

make the billhook perform at least a first full rotation during the first knot forming cycle and a second full rotation during the second knot forming cycle, move the cutting arm a first time from a rest position to an extended position and back during the first knot forming cycle and a second time during the second knot forming cycle, and move the twine finger at least a first time during the first knot forming cycle and a second time during the second knot forming cycle, wherein the twine finger is further configured to guide and position, during the second knot forming cycle, the needle twine between the needle and the twine receiver, and to guide and position the tucker twine between the tucker arm and the twine receiver, wherein the twine finger is further configured such that, during the second knot forming cycle, the needle twine is moved away from the tucker twine in order to drape it adjacent to the tucker twine on the billhook, and wherein the driver is further configured to move the twine finger, during the second knot forming cycle, from a rest position to a fully extended first position, then to a less extended second position whilst rotating the billhook, and next to a fully extended third position whilst moving the cutting arm.

2. The knotter system of claim 1, wherein the twine finger is further configured such that during its movement during the second knot forming cycle it drapes first the needle twine on the billhook and next to the tucker twine such that the needle twine is further away from a tip of the billhook than the tucker twine.

3. The knotter system of claim 1, wherein the twine finger is mounted on an upright pivot for lateral swinging movement between a retracted position and an extended position.

4. The knotter system of claim 3, wherein the twine finger comprises:
    a first portion configured to pick up, during a first part of the lateral swinging movement during the second knot forming cycle, the needle twine while not picking up the tucker twine, and
    a second portion configured to pick up, during a second part of the lateral swinging movement during the second knot forming cycle, the tucker twine after the needle twine has been picked up and moved away by the first portion.

5. The knotter system of claim 4, wherein the twine finger has a first end where the upright pivot is provided and a second end comprising a mouth facing the tucker twine.

6. The knotter system of claim 5, wherein the first portion is located on an edge of the twine finger between the mouth and the upright pivot, and the second portion is located at an edge of the mouth.

7. The knotter system of claim 1, wherein the driver comprises an operating link, a crank and a transversely extending shaft, the operating link being attached at one end to the twine finger and at the opposite end to the crank for driving a swinging movement of the twine finger, the crank being fixed to the transversely extending shaft configured to be rotated such that the twine finger performs the swinging movement.

8. The knotter system of claim 7, wherein the transversely extending shaft carries a second crank which carries a cam follower at its outermost end, the cam follower being in position for operating engagement with a cam fixed to a driving shaft for rotation therewith, the cam having at least a first and second lobe for swinging the twine finger during the first and the second knot forming cycle, respectively.

9. The knotter system of claim 8, wherein the second lobe is formed with two peaks and a valley between the two peaks for causing the twine finger, during the second knot forming cycle, to swing from a rest position to a fully extended first position, then to a less extended second position, and next to a fully extended third position.

10. The knotter system of claim 1, wherein the cutting arm is further configured for sweeping a formed knot from the billhook during the first knot forming cycle and during the second knot forming cycle, respectively.

11. The knotter system of claim 1, wherein the driver comprises a pinion and at least a first and second gear stretch provided along the circumference of a disc, the pinion being configured to cooperate with the first and second gear stretch for making the billhook perform a first and second full rotation respectively when the disc is rotated for forming the first and the second knot, respectively.

12. The knotter system of the claim 11, wherein the driver further comprises a cam track and a cam follower, the cam follower being connected with the cutting arm, and the cam track being provided in the disc or in a member mounted for rotating synchronously with the disc, and being configured for moving the cutting arm a first time and a second time during the first and the second knot forming cycle, respectively.

13. A knotter system for performing a knotter cycle comprising a first knot forming cycle and a second knot forming cycle, the knotter system comprising:
    a needle configured for delivering a needle twine;
    a tucker arm configured for delivering a tucker twine;
    a twine receiver configured for holding the needle twine and the tucker twine;
    a billhook;
    a cutting arm configured for cutting twines between the billhook and the twine receiver;
    a twine finger configured for guiding at least the needle twine, the twine finger being mounted moveably below the billhook and the cutting arm; and
    a driver configured to:
        make the billhook perform at least a first full rotation during the first knot forming cycle and a second full rotation during the second knot forming cycle,
        move the cutting arm a first time from a rest position to an extended position and back during the first knot forming cycle and a second time during the second knot forming cycle, and
        move the twine finger at least a first time during the first knot forming cycle and a second time during the second knot forming cycle,
    wherein the twine finger comprises
        a first portion configured to pick up, during a first part of the swinging movement during the second knot forming cycle, the needle twine whilst not picking up the tucker twine, and
        a second portion configured to pick up, during a second part of the swinging movement during the second knot forming cycle, the tucker twine after the needle twine has been picked up and moved away by the first portion.

14. The knotter system of claim 13, wherein the twine finger is mounted on a pivot for lateral swinging movement between a retracted position and an extended position, and wherein the twine finger has a first end where the pivot is provided and a second end comprising a mouth facing the tucker twine.

15. The knotter system of claim 14, wherein the first portion is located on an edge of the twine finger between the mouth and the pivot, and the second portion is located at an edge of the mouth.

16. The knotter system of claim 13, wherein the driver is further configured to move the twine finger, during the second knot forming cycle, from a rest position to a fully extended first position, then to a less extended second position whilst rotating the billhook, and next to a fully extended third position whilst moving the cutting arm.

17. The knotter system of claim 13, wherein the driver comprises an operating link, a crank and a transversely extending shaft, the operating link being attached at one end to the twine finger and at the opposite end to the crank for driving a swinging movement of the twine finger, the crank being fixed to the transversely extending shaft configured to be rotated such that the twine finger performs the swinging movement.

\* \* \* \* \*